United States Patent

[11] 3,579,259

[72] Inventor Shigeru Kato
    Koza-gun, Japan
[21] Appl. No. 835,681
[22] Filed June 23, 1969
[45] Patented May 18, 1971
[73] Assignee Nippon Rocla Pipes Co., Ltd.
    Tokyo, Japan

[54] APPARATUS FOR MAKING A DOUBLE-LAYER REINFORCING CAGE FOR CONCRETE PIPES
4 Claims, 5 Drawing Figs.

[52] U.S. Cl................................................. 219/56,
                                                        140/112
[51] Int. Cl.................................................. B23k 11/00,
                                                        B21f 15/08
[50] Field of Search....................................... 219/56, 58;
                                                        140/112, 92.2

[56]                References Cited
              UNITED STATES PATENTS
1,878,760   9/1932  Cosgrove et al. ............   219/56
1,928,534   9/1933  Halkyard et al. ............  140/112(X)
2,473,859   6/1949  Butler..........................   219/58

3,437,114   4/1969  Whitacre et al. ............   140/112

Primary Examiner—J. V. Truhe
Assistant Examiner—Hugh D. Jaeger
Attorney—Waters, Roditi, Schwartz & Nissen ABSTRACT: An apparatus is provided for making a double-layer reinforcing cage for concrete pipes which permits welding of longitudinally oriented steel bars and circumferentially oriented steel bars of an outer reinforcing cage member and simultaneously and respectively the longitudinally oriented steel bars and circumferentially oriented steel bars of an inner reinforcing cage member. The apparatus comprises a rotor and a feed plate for moving the longitudinally oriented steel bars rotatably mounted on a hollow stationary pipe, and two sets of longitudinally oriented steel rod guide lines for the outer reinforcing cage member and the inner reinforcing cage member respectively are mounted in the periphery of the rotor in such a manner that the two sets of guide lines are spaced apart from each other a predetermined distance, radially of the rotor. A welder for the inner reinforcing cage member and means for supplying circumferentially oriented steel bars to the inner reinforcing cage member are mounted at one end of said hollow stationary pipe.

Patented May 18, 1971

APPARATUS FOR MAKING A DOUBLE-LAYER REINFORCING CAGE FOR CONCRETE PIPES

The present invention relates to an apparatus for making a double-layer reinforcing cage for concrete pipes possessing inner and outer reinforcing cage members.

In the reinforcing cage made by the apparatus according to this invention, the inner reinforcing cage member and the outer reinforcing cage member are each formed of circumferentially oriented steel bars (spirally wound reinforcing bars) and longitudinally oriented steel bars. The circumferentially oriented steel bars and longitudinally oriented steel bars of the inner and outer reinforcing cage members are simultaneously and respectively welded. Thereafter, the inner and outer reinforcing cage members are joined together by suitable spacers welded to these case members. In the welding operation, it is essential that the circumferentially oriented steel bars and longitudinally oriented steel bars be spaced apart at a predetermined distance from one another and that the inner and outer reinforcing cage members and be disposed concentrically and spaced apart from each other at a predetermined distance. If these requirements are not satisfied, then the double-layer reinforcing cage fabricated for use with concrete pipes lacks dimensional accuracy and is not shaped and formed according to the specification. This makes it impossible for the double-layer reinforcing cage to be arranged in a predetermined position with regard to a concrete pipe.

In one conventional form of the apparatus for making reinforcing cages, a set of reinforcing steel bars is disposed longitudinally and arranged to be disposed on the circumference of a circle and rotated to form longitudinally oriented steel bars, and another set of reinforcing steel bars are wound ground said longitudinally oriented steel bars to form circumferentially oriented steel bars. When the conventional apparatus is used for fabricating a double-layer cage, it has hitherto been customary to make an outer reinforcing cage member by this reinforcing cage making apparatus which has only one welder, while an, inner reinforcing cage member of smaller diameter is fabricates separately, and then the inner and outer reinforcing cage members are assembled and held together as a unit.

The process of fabricating the inner and outer reinforcing cage members separately and then assembling them has many disadvantages. For example, the inner and outer reinforcing cage members may become differentially deformed during transportation and assembly, due to the pressure of their own weight, or misalignment of means used for assembling the two members may occur. Such factors make it difficult to assemble the inner and outer reinforcing cage members and outer reinforcing cage member into a unit double-layer reinforcing cage having an accurate shape and configuration with the inner and outer members exactly coaxially disposed to one another. The conventional apparatus has been unsatisfactory in producing at high efficiency double-layer reinforcing cages which can satisfactorily meet the specifications.

An object of the present invention is to provide an apparatus for making a double-layer reinforcing cage for concrete pipes which allows simultaneous fabrication at the inner and outer reinforcing cage members in situ so that the two members can be coaxially disposed accurately, whereby the occurrence of any deformation of the two cage members during transportation and assembly can be prevented and the two accurately shaped cage members can be assembled and joined together to provide a unit double-layer reinforcing cage of high dimensional accuracy.

Other objects of the invention as well as features and advantages thereof will become apparent from the description set forth hereinafter in conjunction with the accompanying drawings, in which.

Figure 1:
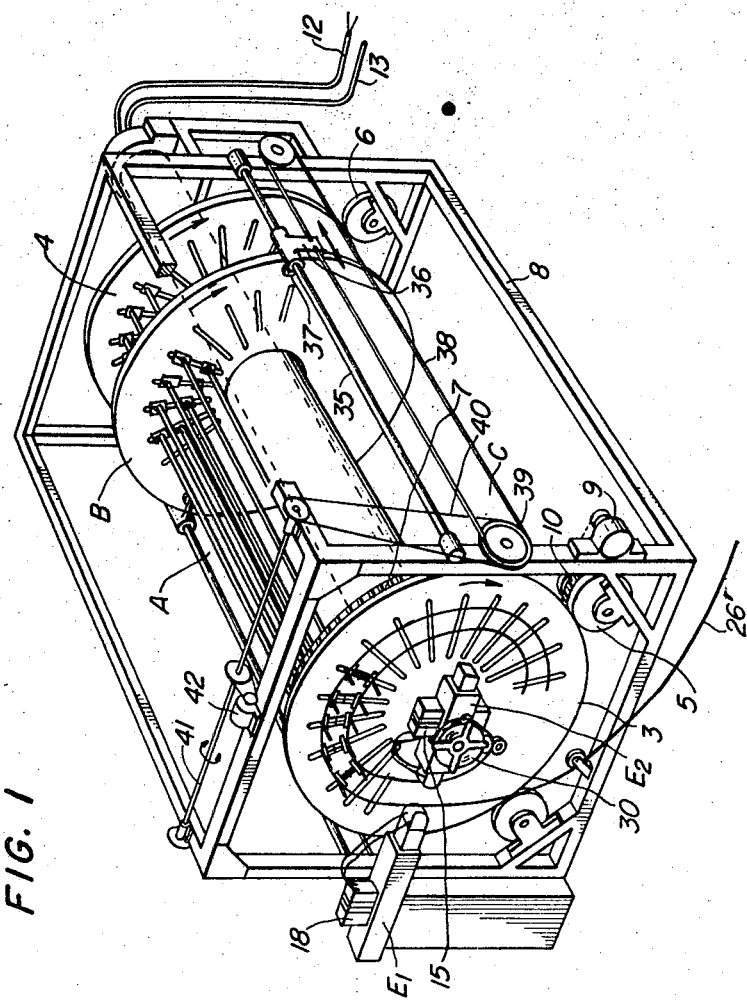
FIG. 1 is a perspective view of one embodiment of the apparatus for making a double-layer reinforcing cage for concrete pipes according to this invention showing the structural layout of the apparatus as a whole.
Figure 2:
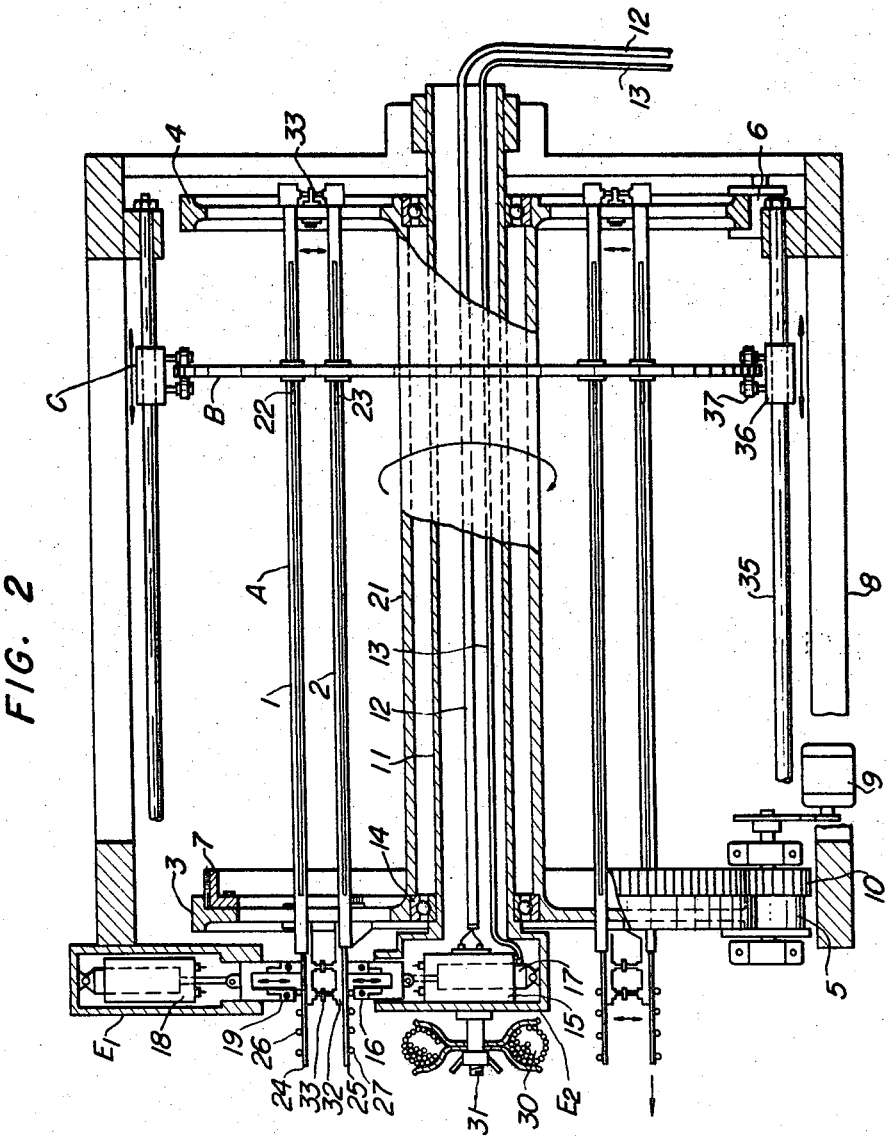
FIG. 2 is a transverse sectional view of the apparatus for making the double-layer reinforcing cage shown in FIG. 1.
Figure 3:
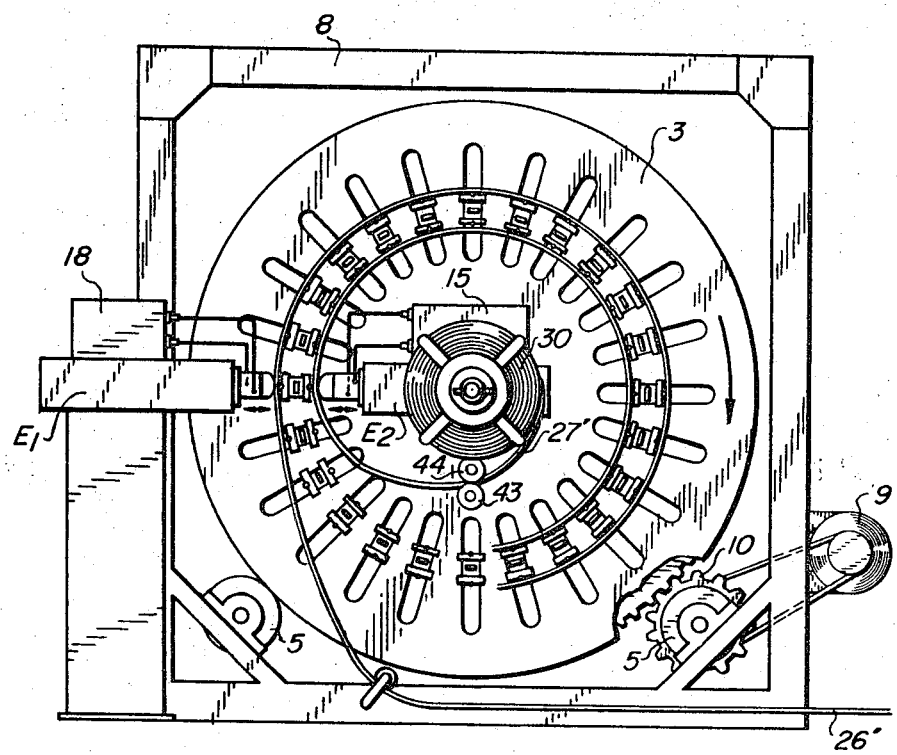
FIG. 3 is a front view of the apparatus shown in FIG. 2.

In the drawings, like reference characters designate similar parts in all the drawings. In FIGS. 1 to 3, A designates a rotor for longitudinally supporting oriented steel bars, B a feed plate for supplying longitudinally oriented steel bars, C feed means for said feed plate B, $E_1$ a welder for an outer reinforcing cage member, and $E_2$ a welder for an inner reinforcing cage member.

The rotor A for supporting longitudinally oriented steel bars supports a first set of longitudinally oriented steel bar guide lines 1 and a second sets of longitudinally oriented steel bar guide lines 2 in such a manner that the said sets of guide lines 1 and 2 are each disposed on the circumference of a circle of a predetermined diameter by means of adjustable mounting means 33. End plates or discs of the rotor 3 and 4 are supported by rollers 5 and 6 respectively. Mounted on the disc 3 for operating the rotor A is a ring gear 7 which is in meshing engagement with a pinion 10 mounted coaxially with the roller 5 and driven by an electric motor 9 mounted on a frame 8 as shown in FIG. 2.

It is not essential that the longitudinally oriented steel bar guide lines 1 and 2 each be arranged coaxially on the circumference of a circle. The guide lines may be arranged in such a manner that they are each arranged on the periphery of an ellipse having one diameter larger than the other diameter crossing each other at right angles so as to form a reinforcing cage for concrete pipes which are subjected to external pressure.

Numeral 11 designates a stationary hollow pipe through which a cable 12 for the transformer for welding the inner reinforcing cage member and an air supply line 13 for an air cylinder are passed. The rotor A is rotatably supported by roller bearings 14 mounted on said hollow stationary pipe 11. The stationary pipe 11 supports in stationary state the welder $E_2$ for the inner reinforcing cage member including a welding transformer 15, electrodes 16 and cylinder 17 for moving the electrodes in sliding motion as well as a coil 30 for supplying circumferentially oriented steel bars to the inner reinforcing cage member. The welder $E_1$ for the outer reinforcing cage member includes a welding transformer 18 and electrode 19 which are mounted externally of the rotor A.

The feed plate B for supplying longitudinally oriented steel bars rotates with a shaft 21 of the rotor A as a unit and is moved axially by the feed means C while guided by guide bars 35. The guide bars 35 are arranged axially of the apparatus and disposed symmetrically on the right and left sides thereof as shown in FIG. 1, said guide bars being firmly fixed to the frame 8 at their ends. In order to facilitate the movement of the feed plate B while rotating, a roller 37 is attached to a guide member 36 mounted on each of said guide bars 35 so as to reduce rotational friction. An electric motor 42 is provided for moving the feed plate B. The electric motor 42 is operatively connected to the guide members 36 on the guide bars 35 through a transmission shaft 41, roller chains 40, chain wheels 39 and pulling chains 38. This arrangement allows the feed plate to move back and forth while it is rotating.

Connected to the feed plate B are a large number of longitudinally oriented steel bar push rods 22 and 23 whose forward ends are inserted in the longitudinally arranged grooves of the associated longitudinally oriented steel bar guide lines for engagement with the rear ends of the longitudinally oriented steel bars in the guide lines. When the feed plate B moves leftwardly as seen in FIG. 2, the forward ends of the push rods 22 and 23 push the rear ends of the longitudinally oriented steel bars inserted in the guide lines 1 and 2 respectively supported by the rotor A and received in the longitudinally arranged grooves therein, whereby longitudinally oriented steel bars 24 and 25 can be moved out of the respective guide lines 1 and 2.

Circumferentially oriented steel bars 26 and 27 to be wound on the longitudinally oriented steel bars 24 and 25 for respectively being joined together by spot welding are unwound from the coils and supplied by respective feed rollers. Although the position in which the coil for supplying circumferentially oriented steel bars to the outer reinforcing cage member and the diameter of the coil are free from restrictions, the position in which the coil for supplying circumferentially oriented steel bars to the inner reinforcing cage member and the diameter of the coil are restricted by the diameter of the double-layer reinforcing cage to be fabricated. In the present invention, the coil of rod 30 which is adapted to supply circumferentially oriented steel bars to the inner reinforcing cage member is supported at one end of the stationary pipe 11 or a stub 31 connected to the end of the stationary pipe 11, and a steel bar 27' unwound from the coil is brought into contact with the inner side of the longitudinally oriented steel bars 25 to form an inner reinforcing cage member. This structural arrangement makes it possible to obtain a compact overall size in the apparatus for making a double-layer reinforcing cage. In cases where the inner reinforcing cage member has a relatively small diameter, only the feed roller may be disposed near the end of the stationary pipe and the coil may be disposed in a suitable position externally of the apparatus for unwinding the bar therefrom and supplying to the apparatus.

The longitudinally oriented steel bar guide lines 1 and 2 are firmly fixed at their ends to welding aid means 32 which is mounted on the disc 3 through adjustable mounting means 32.

The invention has been shown and described hereinabove as having the welding transformer 15 of the welder $E_2$ for the inner reinforcing cage member which is mounted on the left side of the apparatus as shown in FIG. 2. Alternatively, the transformer 15 may be mounted on the right side of the apparatus by connecting the same to the electrode through a bus bar passing through the hollow stationary pipe. This arrangement makes it possible to reduce the diameter of the inner reinforcing cage member that can be fabricated by the apparatus according to this invention, as removal of the transformer from the left side of the apparatus provides a space sufficiently large to make it possible to reduce the diameter of the inner reinforcing cage member.

The air cylinder 17 serves as a means for moving the electrode for welding the inner reinforcing cage member which causes the circumferentially oriented steel bars to bear against the longitudinally oriented steel bars of the inner reinforcing cage member. The operation of the air cylinder can be remotely controlled through an air supply line passing through the hollow stationary pipe. Adjustments of the pressure which is applied to the circumferentially oriented steel bars for pressing the same against the longitudinally oriented steel bars in joining them by spot welding can be effected by controlling the pressure of air as desired.

Figure 4:
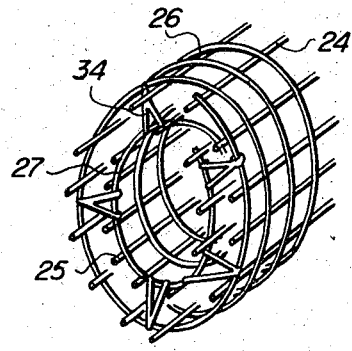
FIG. 4 is a perspective view for explanation of a double-layer reinforcing cage fabricated by the apparatus of this invention.

In operation, the longitudinally oriented steel bars 24 and 25 disposed in the longitudinally oriented steel bar guide lines 1 and 2 respectively are pushed by the push rods 22 and 23 respectively while the rotor A and feed plate B are rotated to fabricate a double-layer reinforcing cage. A bar 26' unwound from a coil (not shown) and the bar 27' unwound from the coil 30 are brought into contact with the outer side of the longitudinally oriented steel bar 24 and the inner side of the longitudinally oriented steel bar 25 respectively and are joined by spot welding. At the same time, an interconnecting member 34 (FIG. 4) is used to temporarily connect the outer reinforcing cage member and the inner reinforcing cage member in any desired position. After the double-layer reinforcing cage is fabricated and removed from the apparatus, the interconnecting members 34 connecting the outer reinforcing cage member and the inner reinforcing cage member together are removed and suitable spacers are joined by welding to the outer and inner reinforcing cage members in suitable positions, so that a double-layer reinforcing cage of any desired shape and dimensions can be provided.

The advantages offered by the apparatus for making a double-layer reinforcing cage for concrete pipes according to this invention will be described hereinafter. The outer and inner reinforcing cage members can be arranged coaxially with a high degree of accuracy. The use of the interconnecting members 34 substantially eliminates deflections of the outer and inner reinforcing cage members. The fact that welding of the longitudinally oriented steel bars and the circumferentially oriented steel bars is effected simultaneously for the outer and inner reinforcing cage members permits fabrication at the double-layer reinforcing cage at a high efficiency. The present invention provides an equipment for making a double-layer reinforcing cage for concrete pipes at high efficiency.

Figure 5:
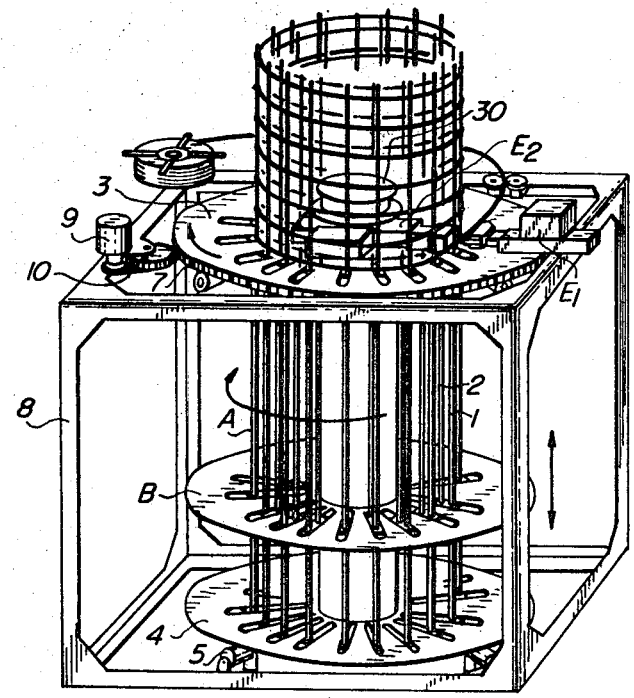
FIG. 5 is a perspective view of another embodiment of the apparatus for making a double-layer reinforcing cage according to this invention.

The apparatus shown in FIGS. 1 to 3 and described in some detail hereinabove is of the horizontal type. FIG. 5 shows another embodiment of the present invention which is an apparatus of the vertical type. The welding mechanism is similar to that of the apparatus of the horizontal type. The rotor A is supported by the rollers 5 maintained in contact with the underside of the lower disc 4 and caused by the motor 9 to rotate about a vertical shaft. The longitudinally oriented steel bars are moved upwardly and the outer and inner reinforcing cage members are simultaneously and successively formed from their lower portions to the upper portions. The use of the apparatus of the vertical type eliminates the danger of the occurrence of sagging of the reinforcing cage in the diametrical direction due to the weight of the cage which may occur when the apparatus of the horizontal type is used.

I claim:

1. An apparatus for making a double-layer reinforcing cage for concrete pipes comprising a hollow stationary pipe firmly fixed to a frame, a rotor mounted concentrically with said hollow stationary pipe in enclosing relationship for rotation about the hollow stationary pipe and including inner and outer guide means for guiding a plurality of circumferentially spaced longitudinally oriented steel bars for forming outer and inner reinforcing cage members, a feed plate maintained in engagement with said guide means for axially moving the longitudinally oriented steel bars of the outer and inner reinforcing cage members while rotating, welders for the outer and inner reinforcing cage members each including an electrode device, a welding transformer and an electrode device moving member, and means for supplying circumferentially oriented steel bars to the outer and inner reinforcing cage members each including a coil of steel bar and roller means for feeding the bar being unwound from the coil, said electrode device and said electrode moving means of said welder for the inner reinforcing cage member and said roller means for supplying circumferentially oriented steel bars to the inner reinforcing cage member being mounted at one end of said hollow stationary pipe.

2. An apparatus for making a double-layer reinforcing cage for concrete pipes as defined in claim 1 in which said guide means includes a plurality of sets of guide lines for guiding the longitudinally oriented steel bars for the outer reinforcing cage member and the longitudinally oriented steel bars for the inner reinforcing cage member respectively, and said rotor is provided with end plates fixedly mounted on axially opposite ends thereof and means for supporting said longitudinally oriented steel bar guide lines for the outer and inner reinforcing cage members between said end plates in such a manner that one set of said longitudinally extending steel bar guide lines for the outer reinforcing cage member and the other set of said longitudinally extending steel bar guide lines for the inner reinforcing cage member are radially spaced apart from each other at a predetermined distance and the guide lines of each set are disposed in positions equidistantly spaced apart from the center axis of said rotor.

3. An apparatus for making a double-layer reinforcing cage for concrete pipes as defined in claim 1 in which said welding transformer for the inner reinforcing cage member is mounted at the end of said hollow stationary pipe on the side of said apparatus where the welding of said longitudinally oriented steel bars and said circumferentially oriented steel bars is performed.

4. An apparatus for making a double-layer reinforcing cage for concrete pipes as defined in claim 1 in which the welding transformer of the welder for the inner reinforcing cage member is disposed adjacent that end of said hollow stationary pipe on the side of said apparatus which is opposite to the side thereof where the welding of said longitudinally oriented steel bars and circumferentially oriented steel bars is performed, and a bus bar passing through said hollow pipe for supplying power from said welding transformer to the electrode of the welder for the inner reinforcing cage member.